C. F. DEAN.
Bone Mill.

No. 58,719.

Patented Oct. 9, 1866.

Witnesses:
Samuel N. Piper
F. Curtis.

Inventor:
Chester F. Dean.
by his attorney
R. H. Eddy.

UNITED STATES PATENT OFFICE.

CHESTER F. DEAN, OF ST. JOHNSBURY, VERMONT, ASSIGNOR TO HIMSELF, HORACE PADDOCK, HALSEY R. PADDOCK, AND MOSES E. BARRETT.

IMPROVEMENT IN GRINDING-MILLS.

Specification forming part of Letters Patent No. 58,719, dated October 9, 1866.

*To all whom it may concern:*

Be it known that I, CHESTER F. DEAN, of St. Johnsbury, in the county of Caledonia and State of Vermont, have invented a new and useful or Improved Mill for Grinding Bones; and I do hereby declare the same to be fully described in the following specification, and represented in the accompanying drawings, of which—

Figure 1:
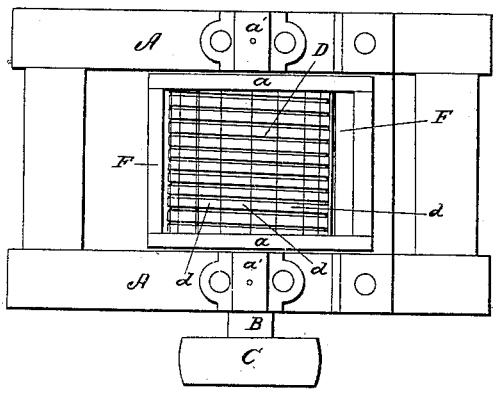
Figure 2:
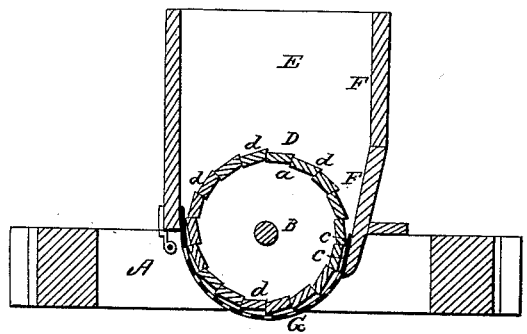
Figure 3:
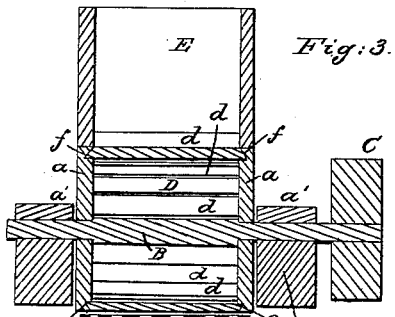

Figure 1 is a top view, Fig. 2 a longitudinal section, and Fig. 3 a vertical section, of it.

In such drawings, A denotes the frame for supporting the operative parts of the mill. Across the said frame there is extended a shaft, B, which is sustained in proper bearings a a, and provided with a driving-wheel, C. The said shaft goes axially through the two heads a a of a grinding-cylinder, D, arranged within the frame and surmounted by a hopper, E, as shown in the drawings.

In front of the cylinder is a chute, F, carrying on its inner surface, or the part of it which is curved, a series of stationary grinding-bars or ridges, c c c, which extend across it. From the lower end of the chute a foraminous apron, G, extends underneath the cylinder and up to the hopper, which should be hinged to the frame in order to enable it to be turned away or back from the cylinder, as occasion may require.

The cylinder has its periphery or grinding-rim composed of a series of metallic bars, d d d, formed and arranged as represented. The front edge of each bar rises above the rear edge of that in advance of it, and the two ends of the bar are beveled, as shown at f f, to fit into corresponding grooves e e, made in the two heads of the cylinder, such grooves, when the heads are fastened in place on the shaft, serving to keep the bars in place. Each of the bars has a series of notches made in its upper surface, so as to form teeth in the bar. Such notches are to be arranged in a helix formed around the entire cylinder and running from head to head thereof.

In forming the said notches the cylinder is to be put in a lathe and be slowly revolved thereby, the chisel or cutter of the lathe being caused to move laterally while cutting into the cylinder while in revolution. The movement of the said cutter should be such as to cut a helical path into the projecting parts of the bars and in such manner as to form the series of teeth on each bar. As these teeth are arranged in a helix curve each tooth of one bar will be a little aside of that in rear or advance of the next bar. Thus the teeth as they revolve will be caused to cut and break the bones to much better advantage than were the teeth arranged in circles transverse to the axis of the cylinder.

The arrangement of each bar is such that any parts of the bones which, after the action of the stationary grinders, may not be reduced small enough to pass through the holes of the apron will be carried around by the cylinder, and will be reground by it and the stationary grinders.

In using the said mill the bones are to be thrown into the hopper while the cylinder may be in rapid revolution toward the chute. The bones will be rasped and reduced to a powder, which will be discharged through the openings of the apron.

I claim—

The combination of the grinding-cylinder, the stationary grinders, and the foraminous apron, arranged as specified.

CHESTER F. DEAN.

Witnesses:
R. H. EDDY,
F. P. HALE, Jr.